US009266395B2

(12) United States Patent
Maled et al.

(10) Patent No.: US 9,266,395 B2
(45) Date of Patent: Feb. 23, 2016

(54) AXLE SHAFT

(71) Applicant: Sypris Technologies, Inc., Louisville, KY (US)

(72) Inventors: Patrick T. Maled, New Albany, IN (US); Stephen W. Straub, Louisville, KY (US); Thomas A. Petschke, Jr., Crestwood, KY (US); Joseph Randolph Masching, New Salisbury, IN (US); David Michael Eblen, Hickory, NC (US); Matthew Yaksic, Marion, OH (US); Alberto Fabián Villalobos Rodriguez, Toluca (MX); Jose Medina Guia, Toluca (MX); Oscar Reyes Morales, Toluca (MX)

(73) Assignee: Sypris Technologies, Inc., Louisville, KY (US)

( * ) Notice: Subject to any disclaimer, the term of this patent is extended or adjusted under 35 U.S.C. 154(b) by 142 days.

(21) Appl. No.: 14/220,485

(22) Filed: Mar. 20, 2014

(65) Prior Publication Data
US 2015/0266343 A1    Sep. 24, 2015

(51) Int. Cl.
*B60B 35/12* (2006.01)
*B60B 35/14* (2006.01)
*F16C 3/02* (2006.01)

(52) U.S. Cl.
CPC ............. *B60B 35/14* (2013.01); *B60B 35/121* (2013.01); *F16C 3/02* (2013.01); *B60B 2900/111* (2013.01); *B60B 2900/112* (2013.01); *B60B 2900/311* (2013.01); *B60B 2900/711* (2013.01); *B60Y 2200/14* (2013.01); *B60Y 2200/142* (2013.01); *F16C 2220/46* (2013.01); *F16C 2326/06* (2013.01)

(58) Field of Classification Search
CPC ........ B60B 35/12; B60B 35/121; B60B 35/14
See application file for complete search history.

(56) References Cited

U.S. PATENT DOCUMENTS

| 1,139,473 | A | | 5/1915 | Barker |
| 3,465,545 | A | * | 9/1969 | Stamm ................. B23K 20/129 228/114.5 |
| 4,188,800 | A | | 2/1980 | Fujita et al. |
| 5,553,927 | A | | 9/1996 | Mastrangelo |
| 6,065,813 | A | | 5/2000 | Fett et al. |
| 6,102,489 | A | | 8/2000 | Boese et al. |
| 6,254,196 | B1 | * | 7/2001 | Gee ........................ B60B 27/00 301/105.1 |
| 7,699,405 | B2 | | 4/2010 | Gradu et al. |

(Continued)

FOREIGN PATENT DOCUMENTS

| EP | 1286087 A1 | 2/2003 |
| WO | 2009120397 A1 | 10/2009 |

OTHER PUBLICATIONS

European Extended Search Report, Application No. 15158623.7, dated Aug. 7, 2015.

*Primary Examiner* — John Walters
*Assistant Examiner* — James Triggs
(74) *Attorney, Agent, or Firm* — MacMillan, Sobanski & Todd, LLC

(57) ABSTRACT

An axle shaft has an inboard end portion with a spline for engagement with a differential assembly and an outboard end with a flange for mounting a wheel hub assembly. One or both of the end portions have cavities for weight reduction. The inboard end portion cavity extends underneath the spline. The outboard end portion cavity extends completely underneath the flange.

19 Claims, 4 Drawing Sheets

(56) References Cited

U.S. PATENT DOCUMENTS

| | | | |
|---|---|---|---|
| 2003/0093888 A1* | 5/2003 | Prucher | B60K 17/165 29/428 |
| 2007/0228809 A1 | 10/2007 | Gradu et al. | |
| 2008/0036290 A1* | 2/2008 | Inoue | B60B 27/00 301/126 |
| 2008/0143174 A1 | 6/2008 | Burkett | |
| 2008/0199121 A1* | 8/2008 | Komori | B60B 27/0005 384/490 |
| 2009/0039700 A1 | 2/2009 | Gradu et al. | |

* cited by examiner

AXLE SHAFT

BACKGROUND OF THE INVENTION

This invention relates in general to axle assemblies and more particularly to axle shafts.

Axle shafts are widely used, particularly in vehicles to support a vehicle wheel for rotation. Many axle shafts connect vehicle wheels to driving devices, such as the differential of an automotive vehicle. Axle shafts, particularly for automotive vehicles, typically are formed of solid metal shafts with their opposite ends formed for connecting to the drive and driven members of the vehicle. For example, a flange may be forged or welded onto one end of the shaft for connection to a wheel hub assembly, while the opposite end of the shaft may be provided with a spline for connection to a differential gear.

Axle shafts must transmit considerable torque and are subjected to rapid starts and stops of power transmission and occasional shock loads. Axle damage such as fractures could occur in an axle shaft which is not robust enough to be handle overload conditions. Unfortunately, axle shafts which are overdesigned to handle shock loads and other extreme torque conditions add undesirable weight and cost.

It would be desirable to provide an axle shaft which will transmit torque under normal and overload conditions, but which is light weight and cost effective.

SUMMARY OF THE INVENTION

The present invention relates to an axle shaft having an elongated solid center section, a first end portion having an external spline, and a second end portion having a radially outwardly extending flange. One or both of the end portions define a cavity. The cavity in the first end portion extends axially underneath the external spline. The cavity in the second end portion extends axially underneath the flange. Preferably, the axle shaft is an integrally formed one-piece steel member with a forged flange. The axle shaft is particularly useful for on-highway heavy duty trucks.

The present invention allows cost efficient, reduced weight axles to be designed with sufficient strength to carry the required torque, even under overload conditions.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
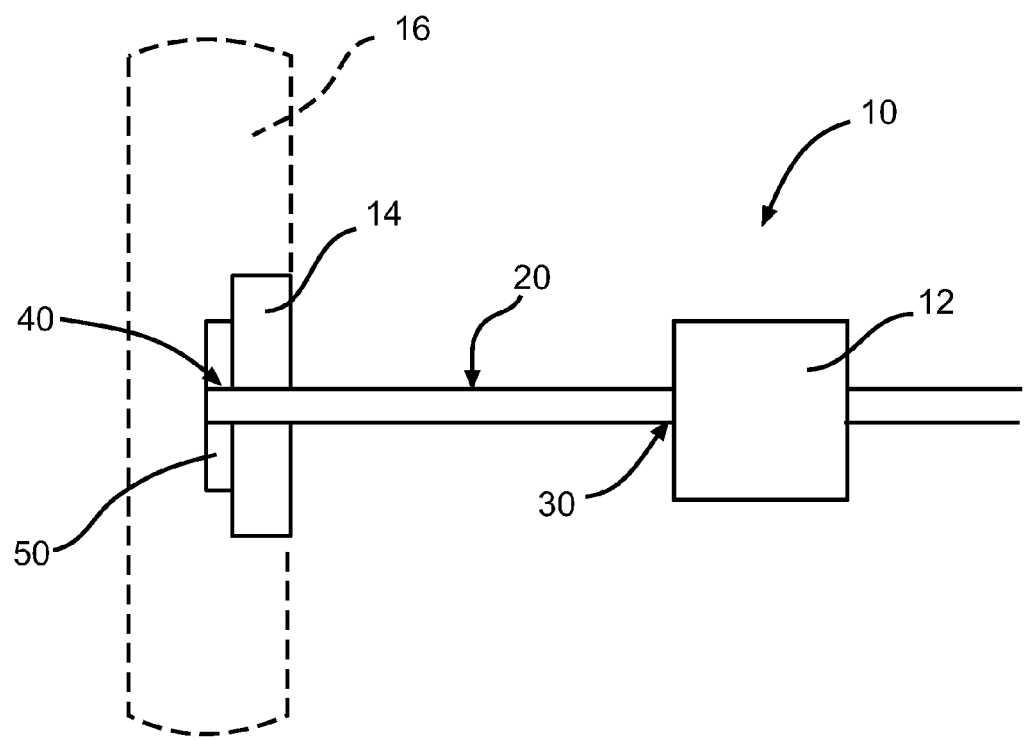
FIG. 1 is a schematic depiction of an axle assembly with the axle shaft of the present invention.

Referring to FIG. 1, a vehicle axle assembly 10 for an on-highway heavy duty truck includes a drive axle shaft 20. The shaft 20 has an inboard spline end portion 30 for driving connection with a side gear of a differential device 12, as is well known in the art. The shaft 20 has an outboard end portion 40 including a wheel drive flange 50. The flange 50 is forged onto the end of the shaft, but alternatively may be attached through a process such as friction welding. The flange 50 includes bolt holes to facilitate attachment of the shaft to a wheel hub assembly 14 which facilitates mounting of a tire and wheel assembly 16.

Figure 2:
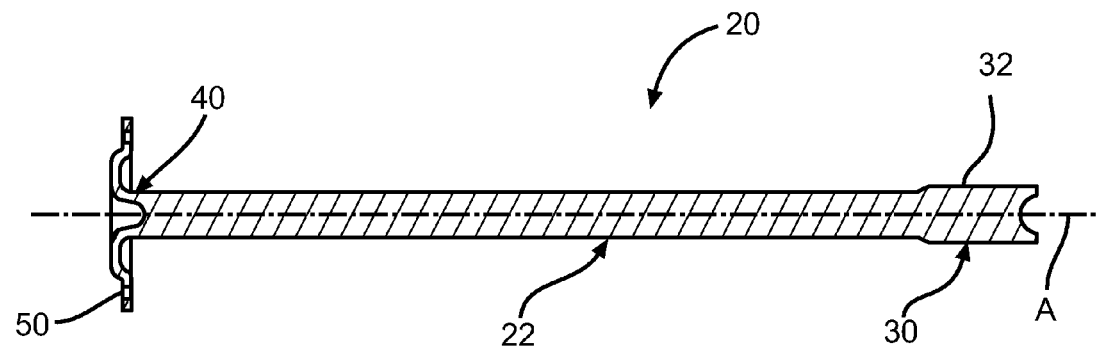
FIG. 2 is a cross-sectional view of an axle shaft of the present invention.

Referring to FIG. 2, the axle shaft 20 has an elongated solid center section 22 having a longitudinal axis "A". The inboard portion 30 of shaft 20 is forged with an enlarged diameter 32 to provide adequate height for a spline for connection with a side gear of the differential assembly 12. The outboard portion 40 includes a flange 50 for driving connection with the hub assembly 14. In a typical on-highway heavy truck, the axle shaft 20 would be about 40 inches long with a center section 22 diameter of about 1.8 inches. The outer surface of the inboard end portion 30 would have an enlarged diameter 32 of about 2.0 inches. The flange 50 would have a diameter of about 8.5 inches and a thickness of about 0.5 inches.

Figure 3:
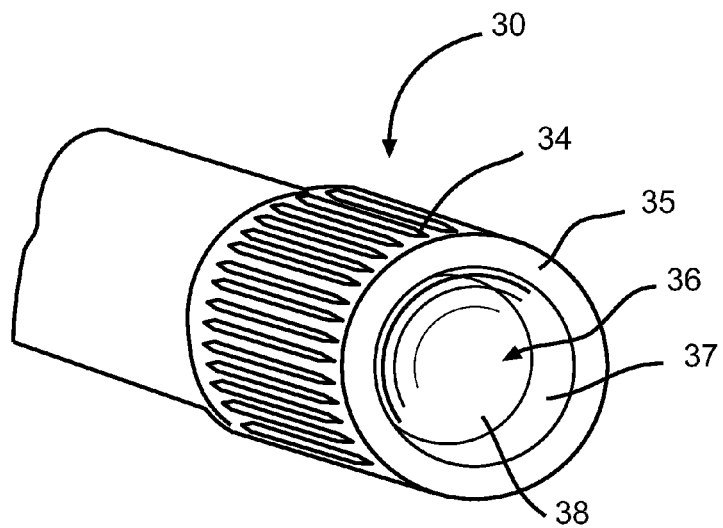
FIG. 3 is a perspective view of the inboard end portion of the axle shaft of FIG. 2.

Referring to FIG. 3, outer surface of the inboard end portion 30 has an external spline 34 configured to engage a side gear of the differential assembly 12. The spline 34 has a length of about four inches. The annular end surface 35 surrounds an internal cavity 36. The cavity 36 extends axially underneath a portion of the spine 34 about 1.25 inches. The cavity 36 is coaxial with the spline 34 for optimum balance.

Figure 4:
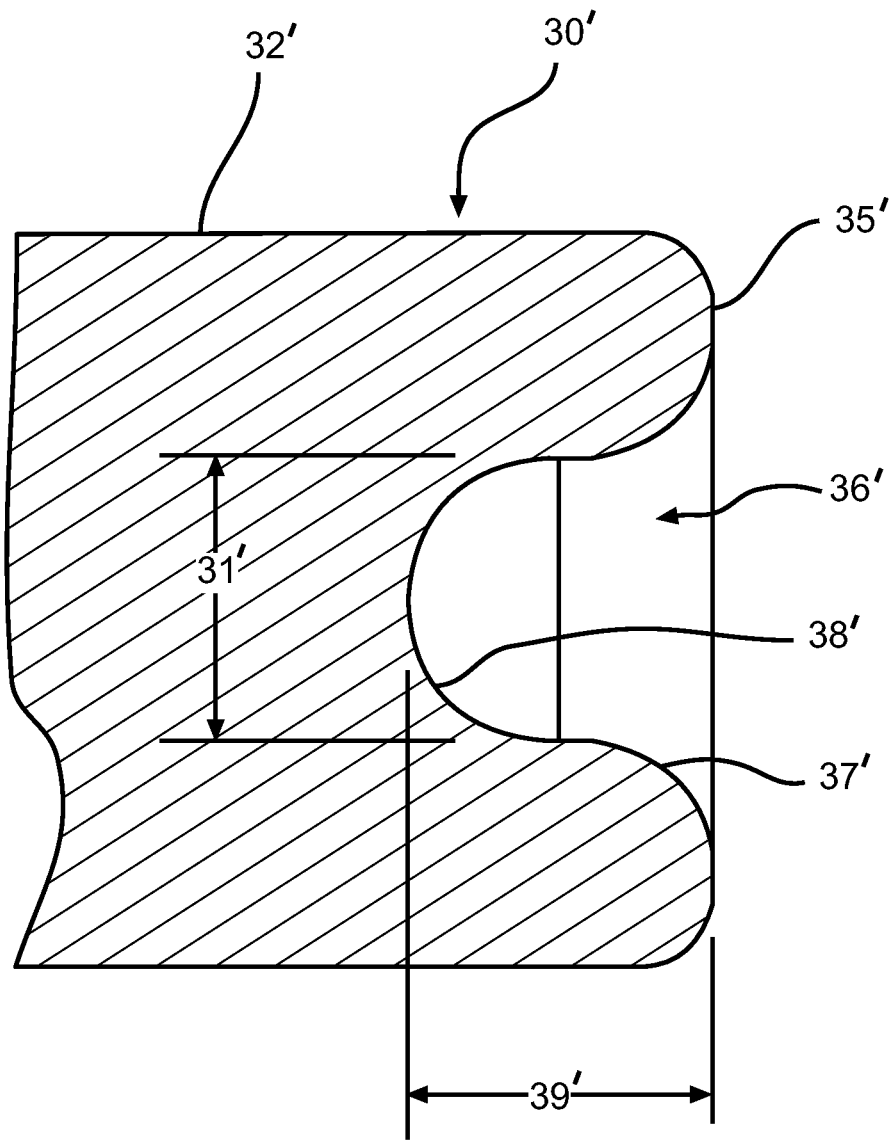
FIG. 4 is a cross sectional view of an alternative inboard end portion of the axle shaft of FIG. 2 prior to finishing.

The cavity 36 has a transition surface 37 extending axially inwardly from the end surface 35 to facilitate forging of eth cavity. The transition surface 37 has a frustoconical shape. The cavity 36 has a relatively flat bottom wall 38. Other cavity shapes may be provided for optimum forge-ability, strength and minimal stress concentrations for various applications. FIG. 4 is a cross-sectional view of an alternative end portion 30'. The end portion 30' has an annular end surface 35' surrounding an internal axially extending cavity 36'. To facilitate forging of the cavity 36', the transition surface 37' has a simple radius which descends into a hemi-spherical bottom wall 38'. The cavity depth 39' is about one inch. The cavity diameter 31' is about 0.8 inches to provide optimum weight reduction and adequate shaft strength. The ratio of cavity diameter to spline diameter is about 0.4, but could vary from about 0.3 to 0.5 with other shaft sizes or strength, torque, etc. characteristics. The ratio of the spline length to cavity depth is about 0.25 but could vary from about 0.2 to about 0.5 with other shaft sizes or characteristics.

Figure 5:
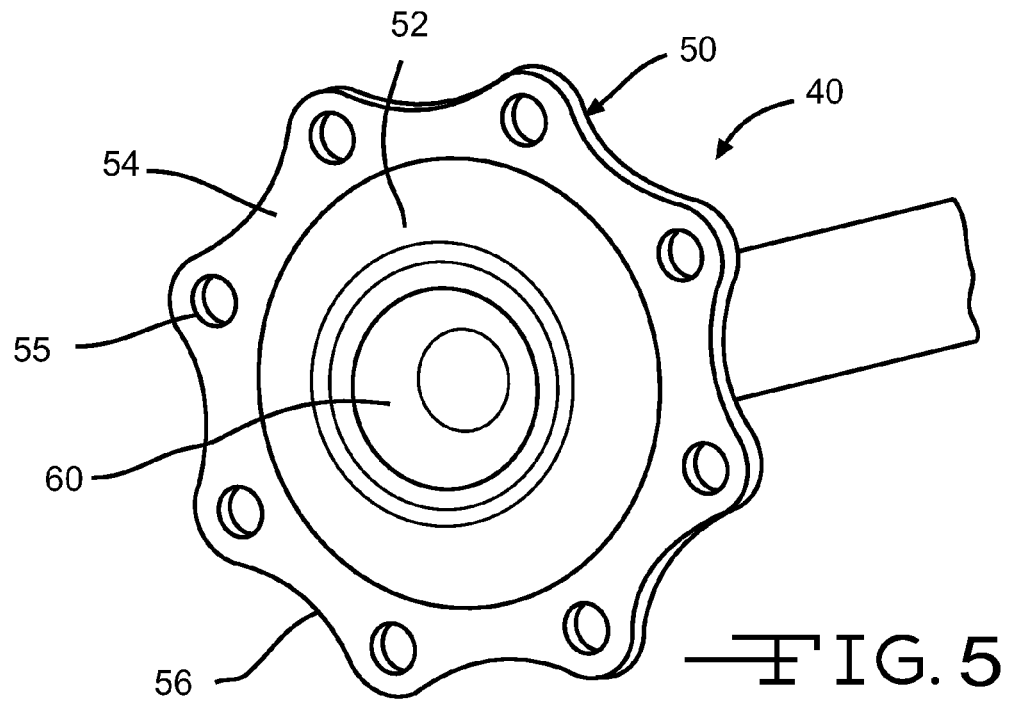
FIG. 5 is perspective view of the second end portion of the axle shaft of FIG. 2.
Figure 6:
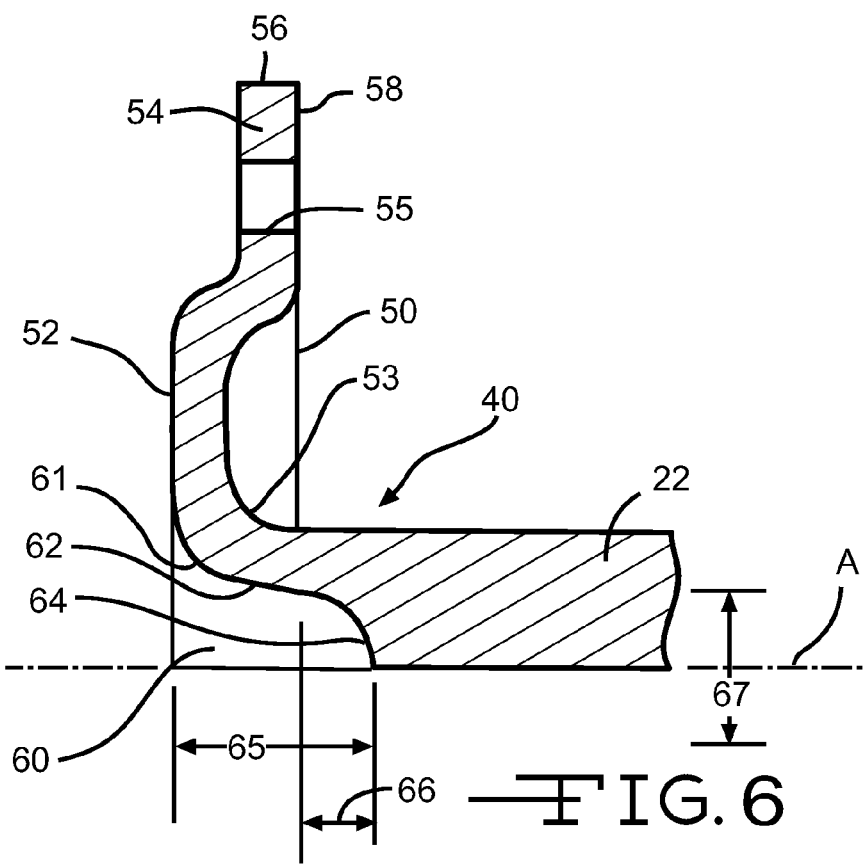
FIG. 6 is a cross-sectional view of the second end portion of the axle shaft of FIG. 2.

Referring to FIGS. 5 and 6, the outboard end 40 of the axle shaft has a radially outwardly extending flange 50. The flange 50 is integrally forged with the axle shaft center portion 22 and inboard portion 30. The flange has an annular bell 52 adjacent the center section 22. The bell 52 extends axially and radially outwardly and has a concave inner surface 53. The bell 52 is optional but can be provided to accommodate certain designs of the wheel hub assembly 14 or related components, such as seals. Without the bell 52, the flange 50 would have the shape of a flat disc.

The flange 50 has an annular flat mounting portion 54 extending radially outwardly from the bell 52. The mounting portion 54 has bolt holes 55 for mounting the wheel hub assembly 14. A flat annular mounting surface 58 is finish machined and configured to abut a flat surface on the wheel hub assembly 14. The flange 50 has a scalloped outer periphery 56 following the bolt hole pattern with an equal number of scallops to reduce weight. The flange 50 has a consistent thickness of about 0.5 inches through both the bell 52 and mounting portion 54.

A cavity 60 extends axially inwardly completely underneath the bell 52 and mounting portion 55 of the flange 50. In other words, the cavity 60 extends axially inwardly past the plane of the axially inner mounting surface 58 and under the center section 22 of the axle shaft. The cavity 60 is formed by forging simultaneously with forging of the flange 50, although it could be formed by machining. The cavity 60 is coaxial with longitudinal axis "A" for optimum balance.

The cavity depth 65 is about 1.25 inches measured from the axially outermost surface of the bell 52. The cavity depth 66 measured from the axially innermost mounting surface 58 of the mounting portion 54 is about 0.9 inches. The ratio of the cavity depth 66 to the center section 22 diameter is about 0.5, but this ratio could vary from about 0.4 to about 0.6 with other shaft sizes or strength, torque, etc. characteristics.

The cavity 60 has an annular transition surface 61 having a simple radius extending axially inwardly from the bell 25 to facilitate forging. The cavity 60 has a generally cylindrical inner wall 62 and a semi-spherical bottom inner surface 64. The cavity diameter 66 is about 0.8 inches. The ratio of the cavity diameter 66 to the center section diameter is about 0.45, but this ratio could vary from about 0.3 to about 0.6 with other shaft sizes or characteristics.

The preferred process for making the axle shaft 20 is to first forge the inboard end to form the cavity 36 and the enlarged diameter portion 32. Next, the outboard end 40 is forged to simultaneously form the flange 50 and the cavity 60. Although forging is presently preferred for forming the cavities, other methods may be used, such as machining. After forging, the spline 34, flange surface 58, etc. are machined, and the axle shaft is hardened as is well known in the art.

The principle and mode of operation of this invention have been explained and illustrated in the preferred embodiments. However, this invention may be practiced otherwise than as specifically explained and illustrated without departing from its spirit or scope as defined in the following claims. For example, the dimensions indicated herein for a preferred embodiment may vary with larger or smaller axle shafts or axle shafts with varying torque characteristics.

What is claimed is:

1. An axle shaft comprising an elongated solid center section having a longitudinal axis, the shaft having first and second longitudinally spaced end portions, the elongated solid center section extending substantially completely between the first and second longitudinally spaced end portions, the first end portion having an outer surface defining an external spline, the second end portion having a radially outwardly extending flange, wherein the first end portion defines a cavity extending axially under the external spline, and wherein the second end portion defines a cavity extending axially under the flange.

2. An axle shaft as defined in claim 1 wherein the flange is integrally formed with the axle shaft.

3. An axle shaft as defined in claim 1 wherein the second end portion cavity extends axially completely under the flange.

4. An axle shaft as defined in claim 1 wherein the flange comprises an axially outwardly extending annular bell adjacent the center section.

5. An axle shaft as defined in claim 4 wherein the flange comprises a planar mounting section radially outwardly spaced from the bell.

6. An axle shaft as defined in claim 5 wherein the flange mounting section is positioned axially inwardly from the bell.

7. An axle shaft as defined in claim 6 wherein the second end portion cavity extends axially completely under the flange bell and mounting section and under a portion of the center section.

8. An axle shaft as defined in claim 1 wherein axle shaft is steel and the flange is integral with the center section.

9. An axle shaft as defined in claim 1 wherein the external spline is configured to engage a vehicle differential assembly.

10. An axle shaft comprising an elongated solid center section having a longitudinal axis, the shaft having an inboard end portion and an outboard end portion, the elongated solid center section extending substantially completely between the first and second longitudinally spaced end portions, the inboard end portion having an outer surface defining an external spline configured for driving engagement with a vehicle differential assembly, the outboard end portion having a radially outwardly extending flange configured for mounting a vehicle wheel hub, wherein the inboard end portion defines an inboard cavity extending axially under the external spline.

11. An axle shaft as defined in claim 10 wherein the ratio of the axial depth of the inboard cavity to the spline length is from about 0.2 to about 0.5.

12. An axle shaft as defined in claim 10 wherein the inboard cavity has an annular portion, and wherein the ratio of the diameter of the annular portion to the spline diameter is from about 0.3 to about 0.5.

13. An axle shaft as defined in claim 10 wherein the inboard cavity has a hemispherical bottom wall.

14. An axle shaft as defined in claim 10 wherein the inboard end portion has a radially extending annular end surface, and wherein the cavity has a hemi-spherical bottom wall and a transition surface extending axially from the end surface to the bottom wall.

15. An axle shaft comprising an elongated solid center section having a longitudinal axis, the shaft having an inboard end portion and an outboard end portion, the elongated solid center section extending substantially completely between the first and second longitudinally spaced end portions, the outboard end portion having a radially outwardly extending flange configured for mounting a vehicle wheel hub, wherein the outboard end portion defines an outboard cavity extending axially under the flange.

16. An axle shaft as defined in claim 15 wherein the center section of the shaft is cylindrical, and wherein flange has an inboard surface for interfacing with a wheel hub assembly, and wherein the ratio of the axial depth of the outboard cavity measured from the inboard surface of the flange to the diameter of the center section of the shaft is from about 0.4 to about 0.6.

17. An axle shaft as defined in claim 15 wherein the center section of the shaft is cylindrical and wherein the outboard cavity has an annular portion, and wherein the ratio of the cavity diameter to the center section diameter is about 0.3 to about 0.6.

18. An axle shaft as defined in claim 15 wherein the flange has a bell and wherein the outboard cavity extends completely under the bell.

19. An axle shaft as defined in claim 15 wherein the cavity has a hemi-spherical bottom wall and a transition surface extending axially from the flange to the bottom wall.

* * * * *